United States Patent [19]
Russell et al.

[11] Patent Number: 5,327,496
[45] Date of Patent: Jul. 5, 1994

[54] COMMUNICATION DEVICE, APPARATUS, AND METHOD UTILIZING PSEUDONOISE SIGNAL FOR ACOUSTICAL ECHO CANCELLATION

[75] Inventors: Steve F. Russell; John F. Doherty, both of Ames, Iowa

[73] Assignee: Iowa State University Research Foundation, Inc., Ames, Iowa

[21] Appl. No.: 85,749

[22] Filed: Jun. 30, 1993

[51] Int. Cl.$^5$ .................... H04K 1/02; H04L 27/30; G10K 11/16
[52] U.S. Cl. .......................................... 380/6; 381/71; 381/73.1; 381/94; 375/1; 375/11; 375/14; 375/99; 375/103
[58] Field of Search .................... 381/56, 58, 71, 73.1, 381/94; 379/406–411; 370/32.1; 375/11–20, 99, 103

[56] References Cited

U.S. PATENT DOCUMENTS

| | | | |
|---|---|---|---|
| 3,826,870 | 7/1974 | Wurm et al. | 381/71 |
| 3,936,606 | 2/1976 | Wanke | 381/71 |
| 4,589,137 | 5/1986 | Miller | 381/94 |
| 4,630,304 | 12/1986 | Borth et al. | 381/94 |
| 4,677,676 | 6/1987 | Eriksson | 381/71 |
| 4,829,590 | 5/1989 | Ghose | 381/71 X |
| 4,987,598 | 1/1991 | Eriksson | 381/71 |
| 5,140,640 | 8/1992 | Graupe et al. | 381/71 |

OTHER PUBLICATIONS

Long, G., et al. "Performance of a Pole–Zero Adaptive Echo Canceller," 1986 IEEE, 1662–1667.
Schroeder, M. R. "Integrated-Impulse Method Measuring Sound Decay Without Using Impulses," 1979 Acoustical Society of America 497–500.
Borish, J., et al., "An Efficient Algorithm for Measuring the Impulse Response Using Pseudorandom Noise," J. Audio Eng Soc, vol. 31, No. 7, Jul.–Aug., 1983 478–487.
Hansler, Eberhard, "The Hands–Free Telephone Problem–An Annotated Bibliography," 1992 Elsevier Science Publishers B.V., 259–267.

Primary Examiner—Bernarr E. Gregory
Attorney, Agent, or Firm—Flehr, Hohbach, Test, Albritton & Herbert

[57] ABSTRACT

A communication device, an apparatus, and a method for acoustic echo cancellation which makes use of a pseudonoise signal. An audio mixer adds the pseudonoise signal to an input signal received from another communication device to produce a first composite signal. An audio system converts the first composite signal to sound in an at least partially enclosed space. The at least partially enclosed space produces an acoustical echo in response. The audio system then converts the acoustical echo and other sounds in the at least partially enclosed space to a second composite signal. A signal processor cross-correlates the second composite signal with the pseudonoise signal to produce an estimate of the overall impulse response of the combined system formed by the at least partially enclosed space and the audio system. The processor then convolves the first composite signal with the impulse response estimate to produce an echo estimation signal. The echo estimation signal is an estimate of the component of the second composite signal which corresponds to the acoustical echo. The processor then subtracts the echo estimation signal from the second composite signal to produce an output signal.

24 Claims, 5 Drawing Sheets

COMMUNICATION DEVICE, APPARATUS, AND METHOD UTILIZING PSEUDONOISE SIGNAL FOR ACOUSTICAL ECHO CANCELLATION

The United States Government has certain rights in this invention pursuant to Contract No. ITA 87-02 between the U.S. Department of Commerce and Iowa State University.

FIELD OF THE INVENTION

The present invention relates generally to apparatuses and methods for canceling an acoustical echo in an at least partially enclosed space which is detected by the audio system of a communication device. In particular, it pertains to an apparatus and a method which cancel the acoustical echo by utilizing a pseudorandom noise signal to estimate the overall impulse response of the combined system formed by the space and the audio system.

BACKGROUND OF THE INVENTION

Many types of communication devices exist which allow for hands free communication between two parties in separate rooms. Such devices include speakerphones, public address systems for auditoriums or meeting rooms, and audio/visual equipment for video classrooms. Furthermore, new technology is being rapidly developed which will make communication devices for audio/visual teleconferencing practical.

The rooms used for this type of communication are typically plagued by acoustical echoes (i.e. acoustical reverberations). These acoustical echoes arise when the far-end communication device provides the near-end communication device with a far-end output audio signal. This signal is then converted to sound by the audio system of the near-end communication device. In response, an acoustical echo is produced within the room. The echo along with the near-end user's speech is converted to a near-end audio signal by the near-end audio system. The near-end audio signal is then transmitted to the far-end communication device as the near-end output audio signal. When this signal is converted to sound by the audio system of the far-end communication device, the far-and user will have difficulty sorting out the near-end speech from the acoustical echo.

A current approach to eliminating the acoustical echo is to use a discrete-time linear adaptive filter. Such an adaptive filter is used to estimate the overall impulse response of the combined system formed by the room and the near-end audio system. From this estimate, the adaptive filter generates an estimation signal which estimates the component of the near-end audio signal produced by the near-end audio system which corresponds to the acoustical echo in the room. The estimation signal is then subtracted from the audio signal to produce the near-end signal.

A major problem associated with this approach is that the convergence time for estimating the overall impulse response of the room and audio system together may be much longer than the stationary period of the overall impulse response. As a result, changes in the room characteristics will lead to serious degradation of the performance of the adaptive filter because it cannot adapt rapidly enough. Such changes may include doors being opened or closed, movement of furniture or people, or changes in the direction of the microphone of the audio system.

Another flaw associated with this approach is that the presence of near-end speech is not readily handled by the adaptive filter. When near-end speech is added to the return path, it is suppressed by the adaptive filter. In order to alleviate this problem, conventional adaptive filter echo cancelers employ near-end speech detectors. These detectors are used to detect large near-end speech energy so that the adaptive filter computations can be suspended during the time interval of the near-end speech. This means that echo canceling is suspended during near-end speech. One undesirable result of this is simplex or one-way conversations. A second undesirable result is the inability of the adaptive filter to adapt to room changes during the time interval of the near-end speech.

OBJECTS OF THE INVENTION

It is therefore an object of the invention to provide a communication device, an apparatus, and a method for acoustical echo cancellation which can rapidly adapt to changes in room characteristics.

It is another object of the invention to provide a communication device, an apparatus, and a method for acoustical echo cancellation which does not suppress near-end speech.

It is still another object of the invention to provide a communication device, an apparatus, and method for acoustical echo cancellation which allows for full-duplex, hands-free, two-way conversation.

SUMMARY OF THE INVENTION

The foregoing and other objects of the invention are achieved by a communication device, an apparatus, and a method for acoustic echo cancellation which makes use of an acoustic pseudonoise signal. The communication device includes the echo cancellation apparatus and an audio system. The echo cancellation apparatus includes a pseudonoise signal generator, an audio mixer, an analog-to-digital converter, a digital-to-analog converter, and a digital signal processor.

The audio mixer adds the pseudonoise signal to an input signal received from another communication device to produce a first composite signal. The audio system converts the first composite signal to sound in an at least partially enclosed space. The at least partially enclosed space produces an acoustical echo in response. The audio system then converts the acoustical echo and other sounds in the at least partially enclosed space to a second composite signal.

The analog-to-digital converter samples the pseudonoise signal and the first and second composite signals and converts them to corresponding digital signals. The digital signal processor cross-correlates the second composite signal with the pseudonoise signal to produce an estimate of the overall impulse response of the combined system formed by the at least partially enclosed space and the audio system. The processor then convolves the first composite signal with the impulse response estimate to produce an echo estimation signal. The echo estimation signal is an estimate of the component of the second composite signal which corresponds to the acoustical echo. Finally, the processor subtracts the echo estimation signal from the second composite signal to produce a digital output signal. The digital output signal is then converted to a corresponding analog output signal by the digital-to-analog converter for transmission to the other communication device.

BRIEF DESCRIPTION OF THE DRAWINGS

The foregoing and other objects of the invention will be more clearly understood from the following detailed description and appended claims when read in connection with the following drawings, in which:

DESCRIPTION OF THE PREFERRED EMBODIMENT

FIGS. 1-5 provide illustrations of the invention disclosed herein. In these figures, like components are designated by like numerals.

Figure 1:
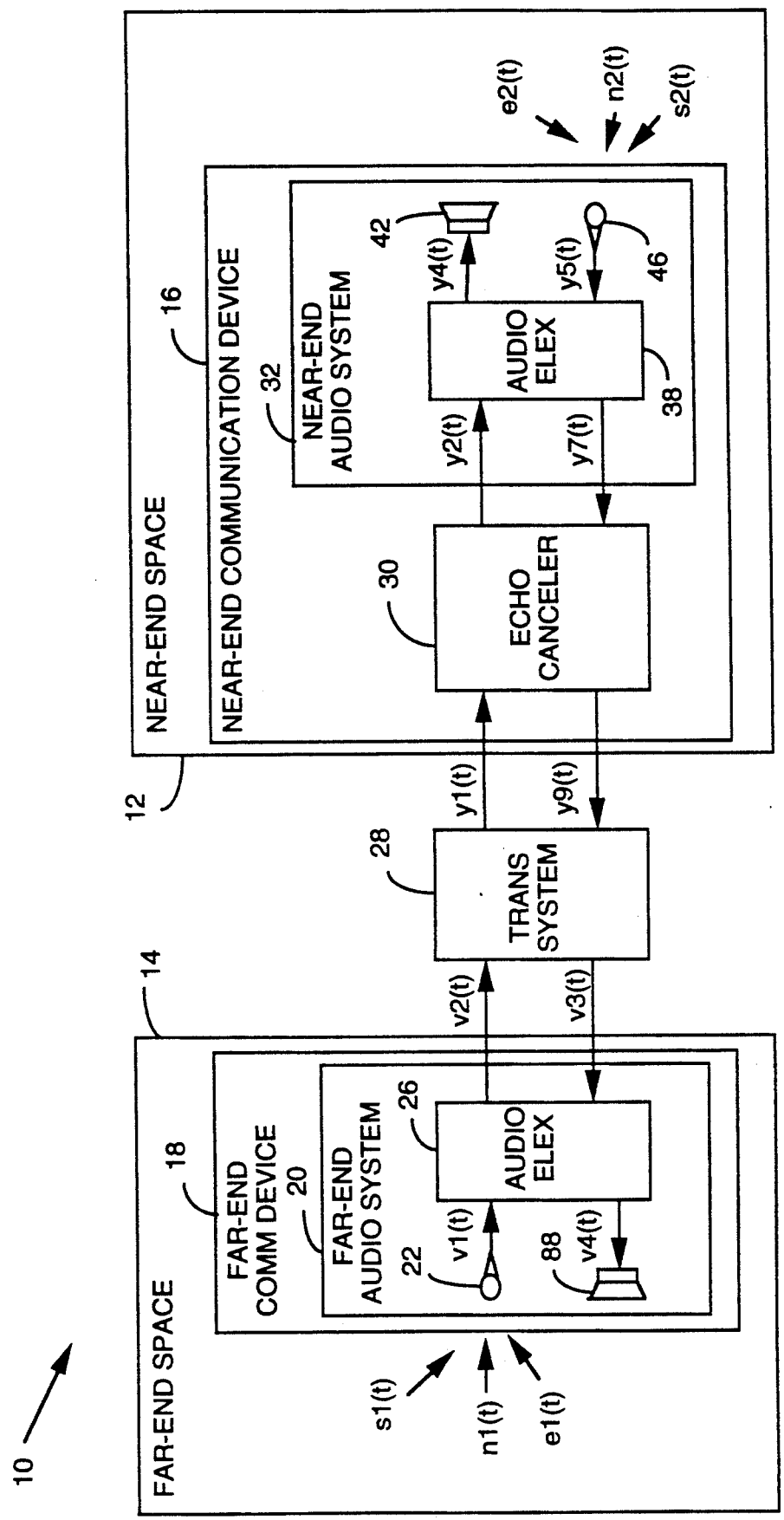
FIG. 1 shows a block diagram of an audio network having a near-end communication device in accordance with the present invention.

Referring initially to FIG. 1, there is shown a block diagram of a full-duplex audio network 10 which connects an at least partially enclosed near-end space 12 and an at least partially enclosed far-end space 14. The at least partially enclosed spaces 12 and 14 may each be (1) a room in a building or home, (2) an auditorium, (3) a meeting room (4) a passenger compartment of a car, (5) a classroom, (6) a teleconferencing room or (7) some other at least partially enclosed structure.

The audio network 10 of FIG. 1 includes a near-end communication device 16 located in the near-end space 12 and a far-end communication device 18 located in the far-end space 14. The near-end and far-end communication devices 16 and 18 may each be (1) a speakerphone for a room or a car, (2) a public address (PA) system for a meeting room, auditorium, or classroom, (3) audio/-visual equipment for a video classroom or a teleconferencing room, (4) a telephone, or (5) some other communication device having an audio system.

For the audio network 10 shown in FIG. 1, the far-end communication device 18 includes a far-end audio system 20 but not an echo canceler. The far-end audio system 20 may be of the type commonly found in any of the communication devices which were described earlier as being suitable for the far-end communication device 18.

As is described later in detail, the microphone 22 of the far-end audio system 20 detects the pressure waves of the far-end user's speech, $s1(t)$, the far-end background noise, $n1(t)$, and a far-end echo, $e1(t)$. The far-end microphone 22 converts the detected pressure waves of these sounds to an analog composite audio signal, $v1(t)$.

The composite audio signal, $v1(t)$, is then amplified and/or filtered with the conventional audio electronics 26 of the far-end audio system 20 to produce the analog far-end composite output audio signal, $v2(t)$. This is done so that the far-end output audio signal, $v2(t)$, can be properly transmitted by the conventional transport system 28.

The far-end output audio signal, $v2(t)$, is then transmitted by the transport system 28 to the near-end communication device 16. This transmitted signal, $v2(t)$, suffers only a minor amount of distortion during the transmission process and is received by the near-end communication device 16 as the analog near-end audio input signal, $y1(t)$. The transport system 28 may be (1) a satellite transmission system, (2) a microwave transmission system, (3) a cellular transmission system, (4) a fiber optic transmission system, (5) a wire transmission system, or (6) some other similar transmission system.

Figure 2:
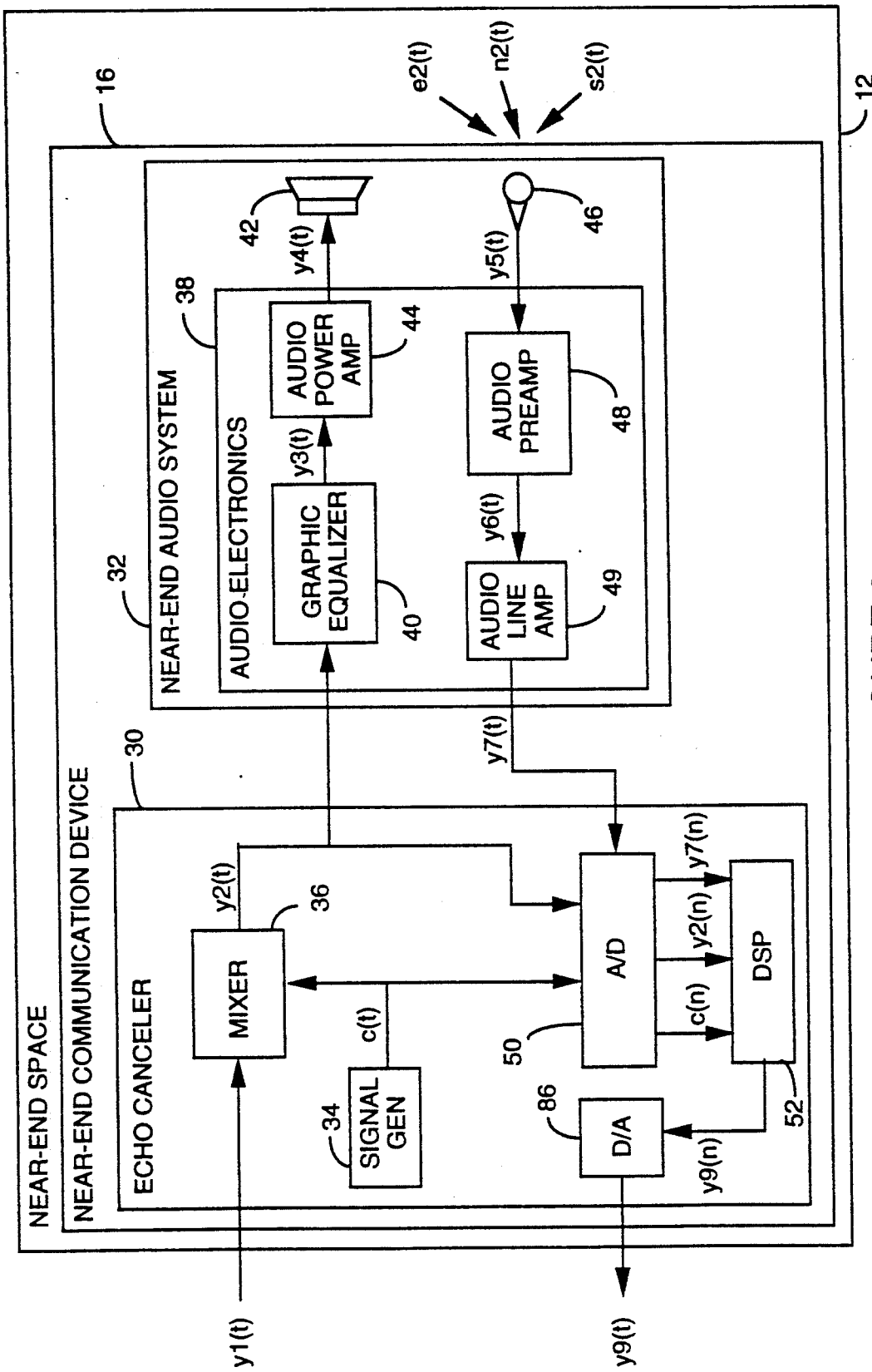
FIG. 2 shows a detailed illustration of the near-end communication device of FIG. 1 including the near-end echo canceler and an associated near-end audio system.

FIG. 2 provides a more detailed illustration of the near-end communication device 16. It includes a near-end echo canceler 30 and a near-end audio system 32.

The spread spectrum pseudonoise signal generator 34 of the near-end echo canceler 30 generates a spread spectrum pseudonoise signal, $c(t)$, in analog format. The spread spectrum signal, $c(t)$, can be generated using either random binary pulse code modulation (PCM) or binary phase shift keying (BPSK). This signal, $c(t)$, can have a code length approximately in the range of 4,000-300,000 chips and can be generated at a code rate approximately in the range of 8,000-64,000 chips per second. In addition, this signal, $c(t)$, can be generated as simply a baseband signal or can be generated with a carrier component. Moreover, the amplitude of the spread spectrum signal, $c(t)$, can be selected to be approximately in the range 10-25 dB below the near-end input audio signal (i.e. the received far-end output audio signal), $y1(t)$.

In the preferred embodiment, the spread spectrum signal, $c(t)$, has a code length of 262,143 chips and is generated as a baseband signal at a code rate of 8,000 chips per second. Also, in the preferred embodiment, the amplitude of the signal, $c(t)$, is selected to be approximately 15 dB below the near-end input audio signal, $y1(t)$.

The audio mixer 36 of the echo canceler 30 receives the spread spectrum signal, $c(t)$, and the near-end input audio signal (i.e. the received far-end output audio signal), $y1(t)$. The audio mixer 36 is of a conventional type and combines these signals, $c(t)$ and $y1(t)$, to produce the analog composite audio signal, $y2(t)=y1(t)+c(t)$. This signal, $y2(t)$, is the input to the near-end audio system 32.

The near-end audio system 32 may be of the type commonly found in any of the communication devices which were described earlier as being suitable for the near-end communication device 16. However, the preferred embodiment of the audio system 32 is illustrated in FIG. 2.

As shown in FIG. 2, the near-end audio system 32 includes the conventional near-end audio electronics 38. The graphic equalizer 40 of the near-end audio electronics 38 receives the composite input audio signal, $y2(t)$, from the audio mixer 36 of the echo canceler 30. The graphic equalizer 40 is of a conventional type and is used to filter the composite input audio signal, $y2(t)$, so that it can be properly converted to sound by the loudspeaker 42 of the audio system 32. In the preferred embodiment, the graphic equalizer 40 filters out frequencies of this signal, $y2(t)$, which are not in the range of 200-4,000 Hz.

The audio power amplifier 44 of the near-end audio electronics 38 receives the filtered composite audio signal, $y3(t)$, from the graphic equalizer 40. The audio power amplifier 44 is of a conventional type and is used to drive the low impedance load of the loudspeaker 42. In other words, the audio power amplifier 44 amplifies the filtered composite audio signal, $y3(t)$, to a level at which it can be properly converted to sound by the near-end loudspeaker 42.

The near-end loudspeaker 42 receives the amplified and filtered composite audio signal, y4(t), from the audio amplifier 44. The loudspeaker 42 is of a conventional type and converts this signal, y4(t), to sound in the at least partially enclosed near-end space 12.

The near-end space 12 has a characteristic impulse response, g2(t). When the filtered and amplified composite audio signal, y4(t), is converted to sound, the near-end space 12 produces an acoustical echo or reverberation, e2(t)=y4(t) * g2(t), in response. The echo, e2(t), is due to the impulse response, g2(t), of the near-end space 12 and is the convolution of the signal, y4(t), with the impulse response, g2(t).

The microphone 46 of the near-end audio system 32 detects the pressure waves of the echo, e2(t), the near-end user's speech, s2(t), and the background noise, n2(t), in the near-end space 12. The microphone 46 converts the detected pressure waves of these sounds to an analog near-end composite audio signal, y5(t). Thus, the composite audio signal, y5(t), has (1) a speech component which corresponds to the near-end speech, s2(t), (2) a noise component which corresponds to the background noise, n2(t), and (3) an echo component which corresponds to the acoustical echo, e2(t).

From the microphone 46, the composite audio signal, y5(t), is provided to the conventional audio preamplifier 48 of the near-end audio electronics 38. The audio preamplifier 48 amplifies the composite audio signal, y5(t), with minimal introduction of noise, to a level at which it can be properly processed by the echo canceler 30 and can be properly transmitted by the transport system 28.

The audio line amplifier 49 of the near-end electronics 38 receives the preamplified composite audio signal, y6(t). The audio line amplifier 49 is of a conventional type and amplifies the composite audio signal, y6(t), so as to drive the low impedance loads of the echo canceler 30 and the transport system 28. This amplified analog composite audio signal, y7(t), is the output of the near-end audio system 32.

Thus, the near-end audio system 32 has two general functions. First, it converts the composite input audio signal, y2(t), to sound in the near-end space 12. Second, it converts the acoustical echo, e2(t), the near-end speech, s2(t), and the near-end noise, n2(t), to the composite output audio signal, y7(t). In view of this, it is clear that the near-end audio system 32 and the near-end space 12 together form a combined system that has an overall impulse response, h2(t). Therefore, the composite output audio signal, y7(t), is the result of the convolution of the composite input signal, y2(t), with the overall impulse response, h2(t).

As is the case with the composite audio signal, y5(t), the composite output audio signal, y7(t), of the audio system 32 has (1) a speech component which corresponds to the near-end speech, s2(t), (2) a noise component which corresponds to the background noise, n2(t), and (3) an echo component which corresponds to the acoustical echo, e2(t). Furthermore, the echo component, y2(t) * h2(t), of the composite output audio signal, y7(t), is the convolution of the near-end composite audio input signal, y2(t), with the overall impulse response, h2(t).

The analog to digital (A/D) converter 50 of the echo canceler 30 receives (1) the analog composite output audio signal, y7(t), from the near-end audio system 32, (2) the analog spread spectrum signal, c(t), from the signal generator 34 and (3) the analog composite input audio signal, y2(t), from the audio mixer 36. The A/D converter 50 is of a conventional type and converts these analog signals, y7(t), c(t), and y2(t), to the corresponding digital signals, y7(n), c(n), and y2(n). As a result, the A/D converter 50 outputs each of these digital signals, y7(n), c(n), and y2(n), to the digital signal processor (DSP) 52 as a sequence of discrete samples at a sampling rate approximately in the range of 8-64 KHz.

In the preferred embodiment, the A/D converter 50 has a sampling rate of 8 kHz. This results in the samples of the digital signals, y7(n), c(n), and y2(n), being received by the DSP 52 at a rate of 8 KHz.

Figure 3:
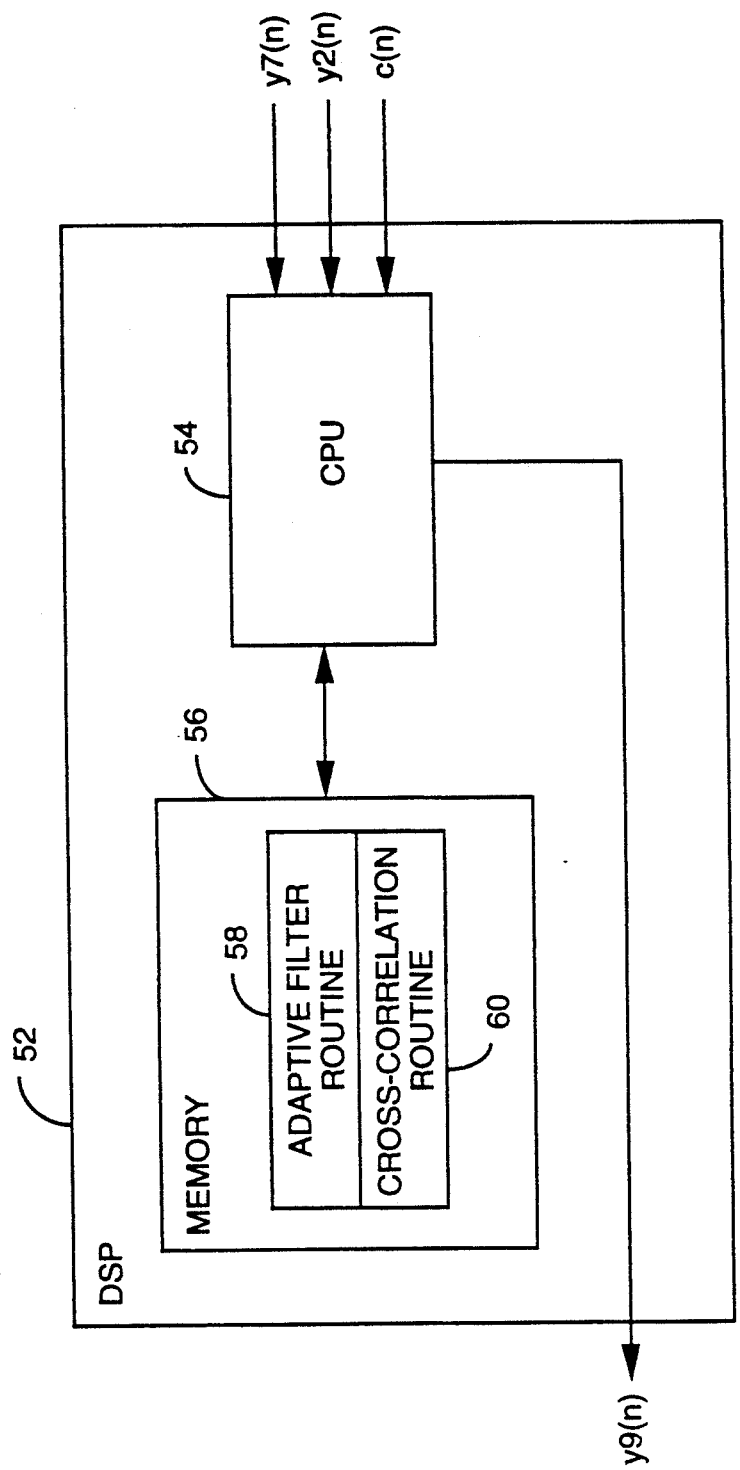
FIG. 3 shows a detailed illustration of the digital signal processor of the near-end echo canceler shown in FIG. 2.

FIG. 3 provides a more detailed illustration of the DSP 52 of the echo canceler 30. It includes a central processing unit (CPU) 54 and a memory 56. The memory 56 stores an adaptive filter routine 58 and a cross-correlation routine 60 which are run simultaneously by the CPU 54 for echo cancellation purposes.

Figure 4:
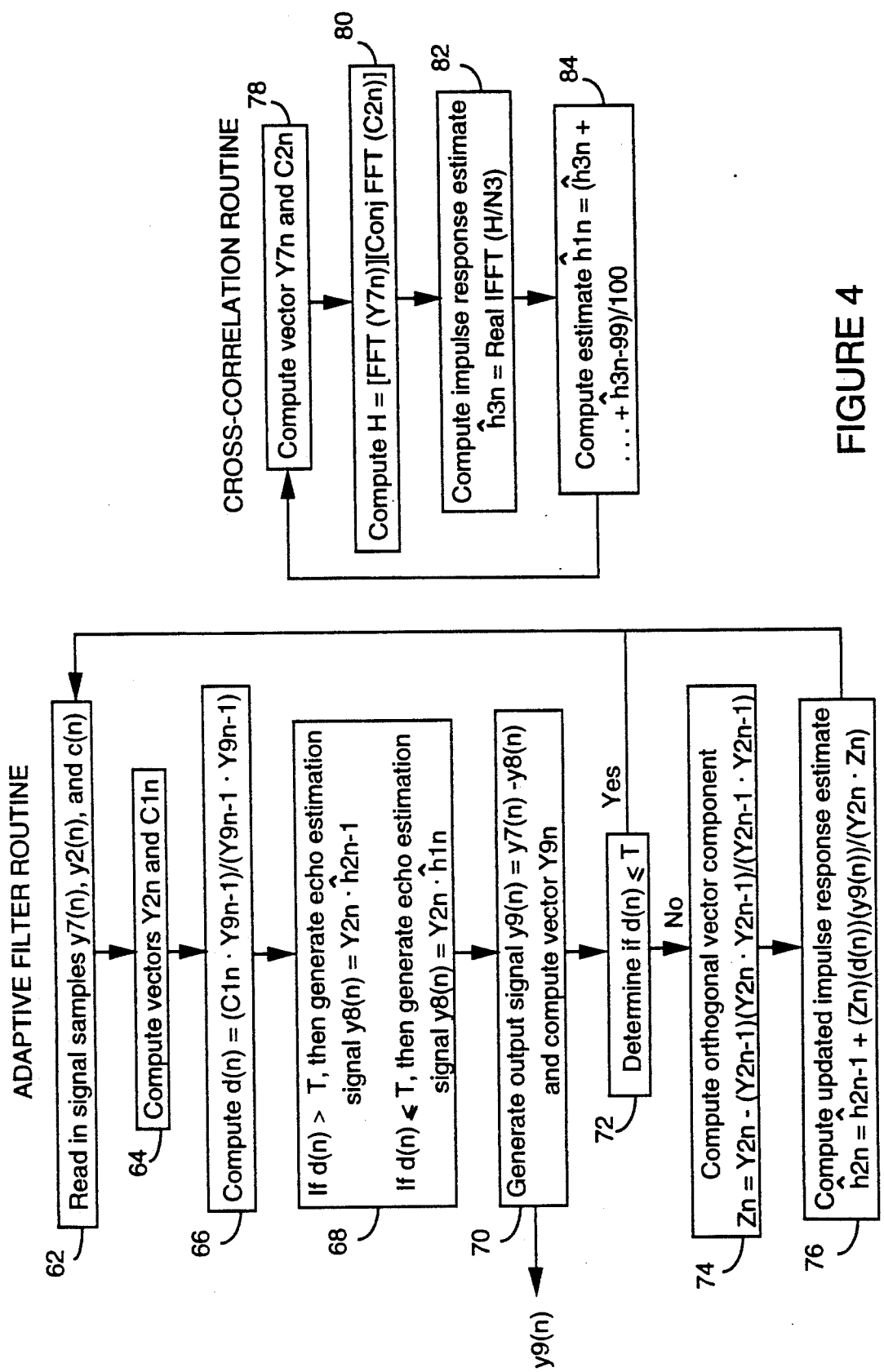
FIG. 4 shows a flow diagram of the adaptive and cross-correlation routines of the digital signal processor shown in FIG. 3.

FIG. 4 provides an illustration of the operation of the DSP 52 in terms of the functions of the adaptive filter routine 58 and the cross-correlation routine 60. As shown in FIG. 4, steps 62-76 pertain to the functions of the adaptive filter routine 58 while the steps 78-84 pertain to the functions of the cross-correlation routine 60.

The echo component, y2(n) * h2(n), of the digital near-end composite output audio signal, y7(n), is the convolution of the digital near-end composite audio input signal, y2(n), with the discrete time overall impulse response, h2(n), of the combined system formed by the near-end space 12 and the near-end audio system 32. In general terms, the cross-correlation routine 60 provides a method for cross-correlating the near-end composite output audio signal, y7(n), with the digital spread spectrum code signal, c(n), to produce a first estimate, ĥ1n, of the overall impulse response, h2(n). And, the adaptive filter routine 58 provides a least-mean-squares type method for generating a second estimate, ĥ2n, of the overall impulse response, h2(n).

If near-end speech, s2(t), is present, the adaptive filter routine 58 will convolve the digital near-end composite input audio signal, y2(n), with the first impulse response estimate, ĥ1n, generated by the cross-correlation routine 60. However, if there is no near-end speech, s2(t), then the adaptive filter routine 58 will convolve the signal, y2(n), with the second impulse response estimate, ĥ2n, it has generated. In either case, the signal resulting from the convolution is subtracted from the near-end audio output signal, y7(n), to remove the earlier described echo component, y2(n) * h2(n).

More specifically, for the adaptive filter routine 58, the first step 62 is to read in the next samples of (1) the digital near-end composite input audio signal, y2(n), (2) the digital near-end composite output audio signal, y7(n), and (3) the digital spread spectrum signal, c(n). The samples for these signals, y2(n), y7(n), and c(n), are all provided by the A/D converter 50.

Once these samples are read in, the next step 64 is for the adaptive routine 58 to generate (1) a spread spectrum sample vector, C1n, for the spread spectrum signal, c(n), and (2) a composite input sample vector, Y2n, for the near-end composite input audio signal, y2(n). The spread spectrum sample vector, C1n, for the spread spectrum signal, c(n), has a length, N1, and contains the N1 most recently read-in samples of the spread spectrum signal, c(n), including the sample read in during step 62. The composite input sample vector, Y2n, has a length, N2, and contains in reverse discrete time order the N2 most recently read-in samples of the near-end composite input audio signal, y2(n), including the sample read in during step 62.

The length, N1, of the spread spectrum sample vector, C1n, is chosen such that the adaptive filter routine 58 can quickly detect the onset of near-end speech, s2(t). This length, N1, can be approximately in the range of 5-50 samples. In the preferred embodiment, the length N1 of the sample vector, C1n, is six.

The length, N2, of the composite input sample vector, Y2n, is equal to the length of the estimated impulse responses, $\hat{h}$1n and $\hat{h}$2n. This length, N2, can be approximately in the range of 300-2,000 samples and is chosen to be sufficient for high fidelity modeling of the overall impulse response, h2(n). However, in the preferred embodiment the length, N2, is 400 samples.

In step 66, the adaptive filter routine 58 computes a decision value, d(n). This decision value, d(n), is computed by first computing the inner product of the spread spectrum sample vector, C1n, and the output sample vector, Y9n-1, computed during the previous loop in step 70. This inner product is then divided by the inner product of the previous output sample vector, Y9n-1, with itself. As will be discussed later with respect to steps 68 and 72, the decision value, d(n), is high when near-end speech, s2(t), is not present and is low when near-end speech, s2(t), is present.

In the following step 68, the adaptive filter routine 58 generates a digital echo estimation signal, yS(n). As was indicated earlier, the echo component of the analog signal, y7(t), is the convolution of the analog near-end composite audio input signal, y2(t), with the overall impulse response, h2(t). The digital echo estimation signal, yS(n), is therefore used to estimate the echo component of the corresponding digital signal, y7(n), and is computed in the following manner.

As was suggested earlier and as will be discussed later with respect to step 72, if near-end speech is not present, then the decision value, d(n), is high. If in this case the decision value exceeds a predefined threshold value, T, the adaptive filter routine 58 generates the echo estimation signal yS(n) by computing the inner product of the composite input sample vector, Y2n, and the impulse response estimate, $\hat{h}$2n-1, generated by the adaptive filter routine 58 in step 76 during the previous loop. Since the samples of the composite input sample vector, Y2n, are in reversed time order, this inner product is the convolution of the composite input audio signal, y2(n), with the impulse response estimate, $\hat{h}$2n-1.

On the other hand, if near-end speech, s2(t), is present, the decision value d(n) is low. This will be described in detail with respect to step 72. If the decision value d(n) does not exceed the threshold value, T, the adaptive filter routine 58 generates the echo estimation signal yS(n) by computing the inner product of the composite input sample vector, Y2n, and the impulse response estimate, $\hat{h}$1n, generated by the cross-correlation routine 60 in step 84. This inner product is the convolution of the composite input audio signal, y2(n), with the impulse response estimate, $\hat{h}$1n.

In step 70, the adaptive filter routine 58 generates (1) a digital near-end output audio signal, y9(n), and (2) a near-end output sample vector, Y9n. The output audio signal, y9(n), is produced by subtracting the echo estimation signal, yS(n), generated in step 68 from the near-end composite output audio signal, y7(n), provided by the A/D converter 50. The near-end output sample vector, Y9n, has a length equal to the length, N1, of the spread spectrum sample vector, C1n, and contains the N1 most recent samples of the near-end output audio signal, y9(n), generated by the adaptive filter routine 58 in step 70.

Because of the subtraction performed in step 70, substantially all of the earlier described echo component, y2(n) * h2(n), of the near-end composite output audio signal, y7(n), is canceled from this signal, y7(n). The result is the substantially echoless digital near-end output audio signal y9(n). As shown in FIG. 2, this signal, y9(n), is the output of the DSP 52 and is provided to the digital to analog (D/A) converter 86.

Step 72 is a decision step for the adaptive filter routine 58. In this step 72, the adaptive filter routine 58 determines whether or not the decision value, d(n), computed in step 66 exceeds the threshold value, T.

As was indicated earlier, the decision value, d(n), will not exceed the threshold value, T, when near-end speech, s2(t), is present. This can be explained as follows. When near-end speech, s2(t), is present, the near-end composite output audio signal, y7(n), will grow in amplitude. This occurs because the signal, y7(n), will have a component corresponding to the near-end speech, s2(t). Therefore, this signal, y7(n), will be substantially different from the composite input audio signal, y2(n). Then, when these two signals, y7(n) and y2(n), are subtracted in step 70, the result will be a large near-end output audio signal, y9(n). Thus, the most recent samples of the near-end output sample vector, Y9n, computed in step 70 will be relatively large in amplitude. As a result, a small value for the decision value, d(n), will have been computed in step 66 because of the large value of the inner product of the output sample vector, Y9n, with itself compared to the smaller value of the inner product of the output sample vector, Y9n, with the spread spectrum sample vector, C1n.

And, as was also suggested earlier, when near-end speech, s2(t), is absent, the decision value, d(n), will exceed the threshold value, T. This occurs because the near-end composite output audio signal, y7(n), no longer has a component corresponding to near-end speech, s2(t). Therefore, this signal, y7(n), will not be substantially different from the composite input audio signal, y2(n). Furthermore, when these two signals, y7(n) and y2(n), are subtracted in step 70, the result will be a small near-end output audio signal, y9(n). Thus, the most recent samples of the near-end output sample vector, Y9n, computed in step 70 will be relatively small in amplitude. As a result, a large value for the decision value, d(n), will have been computed in step 66 because of the small value of the inner product of the output sample vector, Y9n, with itself compared to the comparable value of the inner product of the output sample vector, Y9n, with the spread spectrum sample vector, C1n.

If the decision value, d(n), computed in step 66 does not exceed the threshold value, T, then the adaptive filter 58 bypasses the steps 74 and 76 and begins a new loop at the step 62. Thus, the adaptive filter routine 58 continues to use the impulse response estimate, $\hat{h}$1n, of the cross-correlation routine 60 to compute the echo estimation signal, yS(n), in step 68 until the decision value, d(n), computed in step 66 exceeds the threshold value, T.

If the decision value, d(n), computed in step 66 does exceed the threshold value, T, then the adaptive filter 58 performs steps 74 and 76 before beginning a new loop at step 62. Thus, the adaptive filter routine 58 continues to use the impulse response estimate, ĥ2n-1, of the cross-correlation routine 60 to compute the echo estimation signal, yS(n), in step 68 until the decision value, d(n), computed in step 66 does not exceed the threshold value, T.

The threshold value, T, is selected so that the decision value, d(n), will exceed it when near-end speech, s2(t), is absent and will not exceed it when near-end speech, s2(t), is present. The threshold value, T, is 0.5 in the preferred embodiment.

In the following step 74, the adaptive filter routine 58 computes an estimate of the component, Zn, of the composite input sample vector, Y2n, which is orthogonal to the composite input sample vector, Y2n-1, of the previous loop. This orthogonal component vector, Zn, has a length equal to the length, N2, of the vector, Y2n.

This is done by first computing the inner product of the composite input sample vector, Y2n, with the composite input sample vector, Y2n-1, from the previous loop. This inner product is then divided by the inner product of the vector, Y2n-1, with itself. Then the product of this ratio and the vector, Y2n-1, is subtracted from the vector, Y2n, to produce the orthogonal vector, Zn.

As mentioned earlier, the length, N2, of the orthogonal component vector, Zn, can be approximately in the range of 300–2,000 samples. And, in the preferred embodiment the length, N2, is 400 samples.

The next step 76 of the adaptive routine 58 is to compute an updated least-squares estimate, ĥ2n, of the discrete time overall impulse response, h2(n), of the combined system formed by the near-end space 12 and the near-end audio system 32. This is done by first computing the product of the decision value, d(n), and the near-end output audio signal, y9(n). This product is then divided by the inner product of the composite input sample vector, Y2n, and the orthogonal component vector, Zn. The resulting scaler, is multiplied by the vector, Zn, to produce a correction vector. This correction vector is then added to the least-mean-square impulse response estimate, ĥ2n-1, from the previous loop to produce the updated least-mean-square impulse response estimate, ĥ2n.

As was mentioned earlier, the updated impulse response estimate, ĥ1n, has a length, N2. And, as was also mentioned earlier, this length, N2, can be approximately in the range of 300–2,000 samples and is chosen to be sufficient for high fidelity modeling of the overall impulse response, h2(n). In the preferred embodiment the length, N2, is 400 samples.

Upon completion of step 76, the adaptive filter routine 58 returns to step 62 to begin a new loop. However, at the same time that the adaptive filter routine 58 is running the cross-correlation routine 60 is also running.

The first step 78 of the cross-correlation routine 50 is to (1) generate a near-end composite output sample vector, Y7n, for the near-end composite output audio signal, y7(n), and (2) generate a second spread spectrum sample vector, C2n, for the spread spectrum signal, c(n). The near-end composite output signal, y7(n), and the spread spectrum signal, c(n), are read in by the adaptive filter routine 58 in step 62.

The spread spectrum sample vector, C2n, has a length, N3, and contains the N3 most recently read-in samples of the spread spectrum signal, c(n). The near-end output sample vector, Y7n, has the same length, N3, as does the spread spectrum sample vector, C2n, and contains the N3 most recently read-in samples of the near-end composite output audio signal, y7(n). This length, N3, can be approximately in the range of 4,000–300,000 samples and is chosen to be sufficient for proper cross-correlation of the near-end composite output audio signal, y7(n), and the spread spectrum signal, c(n).

In step 80, the cross-correlation routine 60 computes the product, H, of the Fast Fourier Transform (FFT) of the near-end composite output sample vector, Y7n, and the complex conjugate of the FFT of the spread spectrum sample vector, C2n. This produces the FFT of the impulse response estimate, ĥ3n, computed in the next step 82.

In step 82, as was just suggested, the cross-correlation routine 60 computes the impulse response estimate, ĥ3n. This is accomplished by computing the real portion of the Inverse Fast Fourier Transform (IFFT) of the product, H, computed in step 80 and dividing it by the length, N3, of the spread spectrum vector, C2n.

The impulse response estimate, ĥ3n, has a length, N2. As was mentioned earlier, this length, N2, can be approximately in the range of 300–2,000 samples and is chosen to be sufficient for high fidelity modeling of the overall impulse response, h2(n). As was also mentioned, in the preferred embodiment the length, N2, is 400 samles.

The computation in step 82 together with that in step 80 provides a circular cross-correlation of the near-end composite output audio signal, y7(n), and the spread spectrum signal, c(n). The result is the accurate impulse response estimate, ĥ3n, during near-end speech, s2(t).

The just described FFT/IFFT method of computing an estimate of the cross-correlation of the signals, y7(n) and c(n), is just one possible way to make the computation efficient. Another way would be to compute the time average product of the composite output sample vector, Y7n, with the spread spectrum sample vector, C2n.

Step 84 of the cross-correlation routine 60 makes the impulse response estimate, ĥ3n, even more accurate. This is accomplished by averaging the current estimate, ĥ3n, along with the 100 most recent estimates computed in step 82 to form the impulse response estimate, ĥ1n.

Like the impulse response estimate, ĥ3n, the averaged impulse response estimate, ĥ1n, has a length, N2. As was mentioned earlier, this length, N2, can be approximately in the range of 300–2,000 samples and in the preferred embodiment the length, N2, is 400 samples.

The averaged impulse response estimate, ĥ1n, is continuously available to the adaptive filter routine 58 but used only when the decision value d(n) does not exceed the threshold value, T. Upon completion of step 84, the cross-correlation routine 60 returns to step 78 to begin the next loop.

Returning to FIG. 1, the digital near-end output audio signal, y9(n), produced by the adaptive filter routine 58 is then outputted by the DSP 52 to the digital-to-analog converter (D/A) 86. The D/A converter 86 is of a conventional type and converts the digital near-end output audio signal, y9(n), to its corresponding analog signal, y9(t).

The analog near-end output audio signal, y9(t) is then transmitted by the transport system 28 to the far-end communication device 18. This transmitted signal, y9(t), suffers only a minor amount of distortion during the transmission process and is received by the far-end communication device 18 as the analog far-end input audio signal, v3(t).

The far-end input audio signal (i.e. the near-end output audio signal), v3(t), is then filtered and/or amplified with the conventional audio electronics 26 of the far-end audio system 20 to produce the far-end audio signal, v4(t). This is done so that the audio signal, v4(t), can be properly converted to sound by the loudspeaker 88 of the far-end audio system 20.

The far-end loudspeaker 88 receives the audio signal, v4(t), from the audio electronics 26. The loudspeaker 42 is of a conventional type and converts this signal, v4(t), to sound. As a result, the far-end echo, e1(t)=v4(t) * g1(t), is produced in the far-end space 14 due to the characteristic impulse response, g1(t), of the far-end space 14. The echo, e1(t), is the convolution of the signal, v4(t), with the impulse response, g2(t).

As was described earlier, the microphone 22 detects the pressure waves of the far-end speech, s1(t), and the far-end background noise, n1(t), and the far-end echo, e1(t). Therefore, when the composite input audio signal, y2(t), is converted to sound by the near-end audio system 32, the near-end user will hear far-end speech and background noise distorted by the far-end echo.

Figure 5:
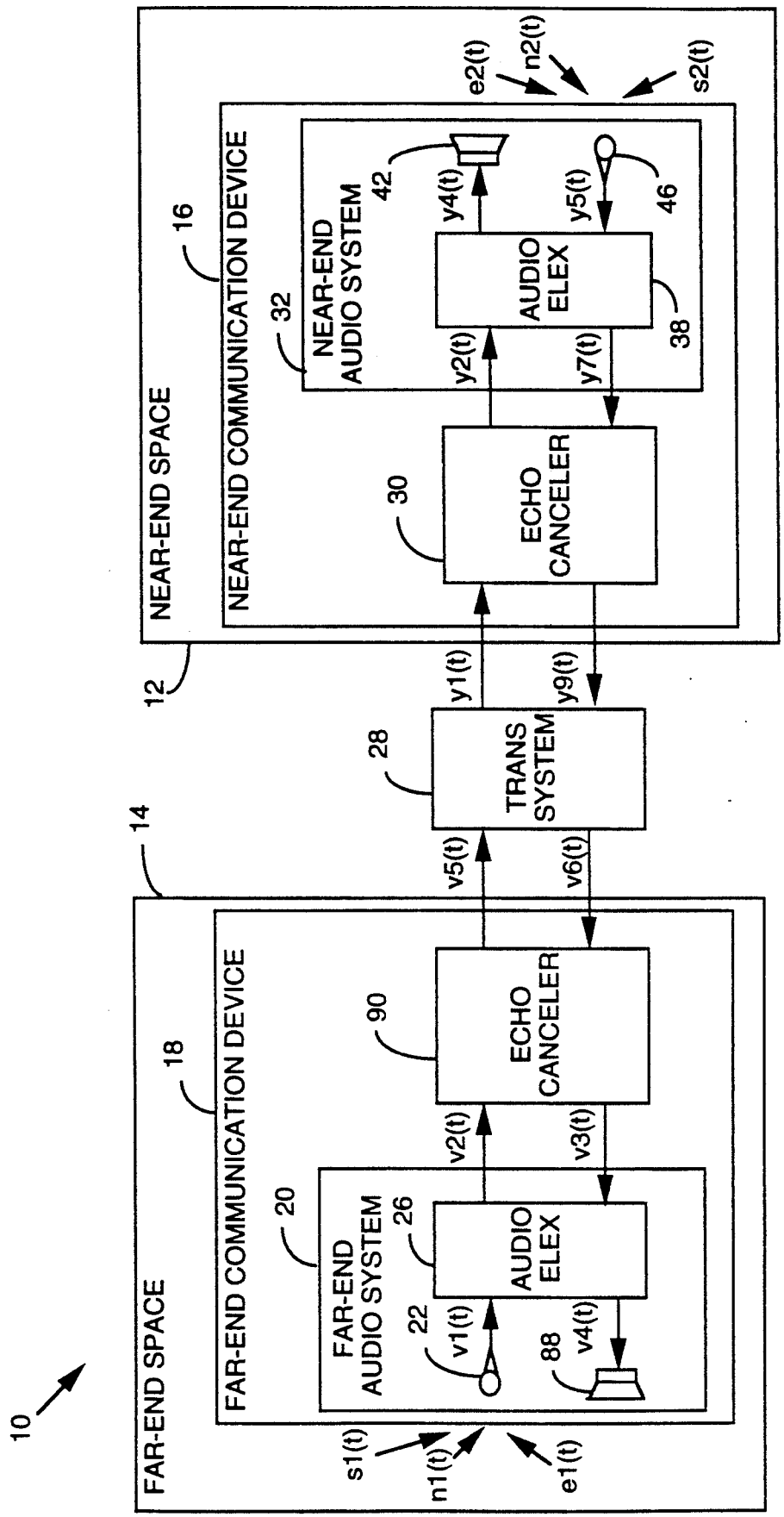
FIG. 5 shows another embodiment of an audio network in accordance with the present invention.

In order to alleviate this problem, a far-end echo canceler 90 can be added to the far-end communication device 18, as shown in FIG. 5. The echo canceler 90 is configured like the echo canceler 30 described earlier. It removes the echo component of the far-end composite output audio signal, v2(t), which corresponds to the acoustical echo, e1(t). This echo component is due to the overall impulse response, h1(t), of the combined system formed by the far-end space 14 and the far-end audio system 20. Thus, the echo canceler 90 uses the same method discussed earlier with respect to echo canceler 30 for generating an estimate of the discrete time overall impulse response, h1(t). This estimate is then used by the echo canceler 90 in order to remove the echo component of the far-end composite output audio signal, v2(t), and produce in response the far-end output signal, v5(t).

If either of the far-end or near-end communication devices 16 or 18 are a telephone, the far-end user's head is for the most part coupled to the loudspeaker 88 so as to inhibit an echo, e1(t), from being produced in the far-end space 14. As a result, the microphone 22 detects the pressure waves of the far-end speech, s1(t), and the far-end background noise, n1(t), and only a small amount of echo, e1(t), if at all. As a result, when the composite input audio signal, y2(t), is converted to sound by the near-end audio system 32, the near-end user will hear far-end speech and far-end background noise but will hear very little far-end echo. Thus, in the case where the communication device 16 or 18 is a telephone, the addition of the far-end echo canceler 30 or 90 will not have as drastic an effect in improving performance as is the case for other types of communication devices. Nevertheless, the described echo canceler 30 or 90 and associated method may be used with a telephone.

The earlier described communication device 16 or 18, near-end echo canceler 30 or 90, and associated method provide several significant advantages over the prior art. These advantages are evident from the earlier description of the communication device 16, the echo canceler 30, and associated method.

In particular, the cross-correlation produced by the cross-correlation routine 60 enables the echo canceler and adaptive filter routine 58 to generate an echo estimation signal, yS(n), which does not result in the suppression of the component of the audio output signal, y7(t), which corresponds to the near-end speech, s2(t). In addition, unlike the prior art, the described method for switching between the impulse response estimates, ĥ1n and ĥ2n, allows for duplex conversation (i.e. double talk). And lastly, the combination of the echo canceler and adaptive filter routine 58 and the cross-correlation routine 60 allows for quick adaptation to changes in the actual overall impulse response, h(t), of combined system formed by the near-end space 12 and the near-end audio system 32.

Numerous other alternatives exist for the audio network 10. For example, in FIG. 2, rather than having the near-end echo canceler 30 and the near-end audio electronics 38 located within the near-end space 12, both or portions of both may be located external to the near-end space 12. Furthermore, the near-end audio system 32 may include multiple loudspeakers 42 and/or multiple microphones 46. In the event that the audio system 32 includes multiple microphones 46, the audio preamplifier 48 will be replaced by a conventional audio mixer which includes a preamplifier and which is coupled to each of the multiple microphones 46.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A communication device comprising:
    a signal generator for generating a pseudonoise signal;
    an audio mixer responsive to an input audio signal and said pseudonoise signal for combining said input audio signal with said pseudonoise signal to produce a first composite signal;
    an audio system responsive to said first composite signal for converting said first composite signal to sound in an at least partially enclosed space, said at least partially enclosed space producing an acoustical echo in response, said audio system also for converting said acoustical echo and other sounds in said at least partially enclosed space to a second composite signal, said second composite signal including an echo component corresponding to said acoustical echo, said at least partially enclosed space and said audio system together forming a combined system having an overall impulse response;
    means responsive to said second composite signal and said pseudonoise signal for generating a first estimate of said overall impulse response;
    means responsive to said first composite signal and said first estimate for generating an echo estimation signal corresponding to an estimate of said echo component of said second composite signal; and
    means for subtracting said echo estimation signal from said second composite signal to produce an output audio signal.

2. The device of claim 1 wherein said means for generating said first estimate includes means for cross-correlating said second composite signal and said psneudonoise signal.

3. The device of claim 2 wherein said means for generating said echo estimation signal includes means for convolving said first composite signal with said first estimate.

4. The device of claim 1 further comprising:
means responsive to said output audio signal and said pseudonoise signal for computing a decision value;
wherein said means for generating said echo estimation signal includes first means responsive to said decision value and to said first estimate for producing said echo estimation signal based on said first estimate only when said decision value does not exceed a predefined threshold value.

5. The device of claim 4 further comprising:
means responsive to said first composite signal and said output signal for generating a second estimate of said overall impulse response;
wherein said means for generating said echo estimation signal includes second means responsive to said decision value and to said second estimate for producing said echo estimation signal based on said second estimate only when said decision value exceeds said threshold value.

6. The device of claim 5 wherein:
said means for generating said first estimate includes means for cross-correlating said second composite signal and said pseudonoise signal; and
said first means includes means for convolving said first composite signal with said first estimate;
said second means includes means for convolving said first composite signal with said second estimate.

7. An acoustical echo cancellation apparatus for use with an audio system, said audio system responsive to a first composite signal for converting said first composite signal to sound in an at least partially enclosed space, said at least partially enclosed space producing an acoustical echo in response, said audio system also for converting said acoustical echo and other sounds in said at least partially enclosed space to a second composite signal, said second composite signal including an echo component corresponding to said acoustical echo, said at least partially enclosed space and said audio system together forming a combined system having an overall impulse response, said apparatus comprising:
a signal generator for generating a pseudonoise signal;
an audio mixer responsive to an input audio signal and said psneudonoise signal for combining said input audio signal with said pseudonoise signal to produce said first composite signal;
means responsive to said second composite signal and said pseudonoise signal for generating a first estimate of said overall impulse response;
means responsive to said first composite signal and said first estimate for generating an echo estimation signal corresponding to an estimate of said echo component of said second composite signal; and
means for subtracting said echo estimation signal from said second composite signal to produce said output audio signal.

8. The apparatus of claim 7 wherein said means for generating said first estimate cross-correlates said second composite signal and said pseudonoise signal for generating said first estimate.

9. The apparatus of claim 8 wherein said means for generating said echo estimation signal includes means for convolving said first composite signal with said first estimate.

10. The apparatus of claim 7 further comprising:
means responsive to said output audio signal and said pseudonoise signal for computing a decision value;
wherein said means for generating said echo estimation signal includes first means responsive to said decision value and to said first estimate for producing said echo estimation signal based on said first estimate only when said decision value does not exceed a predefined threshold value.

11. The apparatus of claim 10 wherein said first means includes means for convolving said first composite signal with said first estimate.

12. The apparatus of claim 11 wherein said means for generating said first estimate includes means for cross-correlating said second composite signal and said pseudonoise signal.

13. The apparatus of claim 10 further comprising:
means responsive to said first composite signal and said output signal for generating a second estimate of said overall impulse response;
wherein said means for generating said echo estimation signal includes second means responsive to said decision value and to said second estimate for producing said echo estimation signal based on said second estimate only when said decision value exceeds said threshold value.

14. The apparatus of claim 13 wherein said second means includes means for convolving said first composite signal with said second estimate.

15. The apparatus of claim 14 wherein:
said means for generating said first estimate includes means for cross-correlating said second composite signal and said psnudonoise signal; and
said first means includes means for convolving said first composite signal with said first estimate.

16. A method of acoustical echo cancellation for use with an audio system, said audio system responsive to a first composite signal for converting said first composite signal to sound in an at least partially enclosed space, said at least partially enclosed space producing an acoustical echo in response, said audio system also for converting said acoustical echo and other sounds in said at least partially enclosed space to a second composite signal, said second composite signal including an echo component corresponding to said acoustical echo, said at least partially enclosed space and said audio system together forming a combined system having an overall characteristic impulse response, said method comprising the steps of:
generating a pseudonoise signal;
combining an input audio signal with said pseudonoise signal to form said first composite signal;
generating a first estimate of said overall impulse response in response to said second composite signal and said pseudonoise signal;
generating an echo estimation signal corresponding to an estimate of said echo component in response to said first composite signal and said first estimate; and
subtracting said echo estimation signal from said second composite signal to produce an output signal.

17. The method of claim 16 wherein said step of generating said first estimate includes the step of cross-correlating said second composite signal and said pseudo-random noise signal.

18. The method of claim 17 further comprising the steps of:
  computing a decision value in response to said output signal and said pseudonoise signal;
  wherein said step of generating said echo estimation signal includes the step of producing said echo estimation signal based on said first estimate only when said decision value does not exceed a predefined threshold value.

19. The method of claim 18 further comprising the step of:
  generating a second estimate of said impulse response in response to said first composite signal and said output signal;
  wherein said step of generating said echo estimation signal includes the step of producing said echo estimation signal based on said second estimate only when said decision value exceeds said threshold value.

20. The method of claim 18 wherein said step of producing said echo estimation signal based on said first estimate includes the step of convolving said first composite signal with said first estimate.

21. The method of claim 20 wherein said step of generating said first estimate includes the step of cross-correlating said second composite signal and said pseudonoise signal.

22. The method of claim 21 wherein said step of producing said echo estimation signal based on said second estimate includes the step of convolving said second composite signal with said second estimate.

23. The method of claim 22 wherein:
  said step of generating said first estimate includes the step of cross-correlating said second composite signal and said pseudonoise signal; and
  said step of producing said echo estimation signal based on said first estimate includes the step of convolving said first composite signal with said first estimate.

24. The method of claim 17 wherein said step of generating said echo estimation signal includes the step of convolving said first composite signal with said first estimate.

* * * * *